J. K. LANDIS.
Straw Cutter.
No. 3,234.
Patented Aug. 26, 1843.
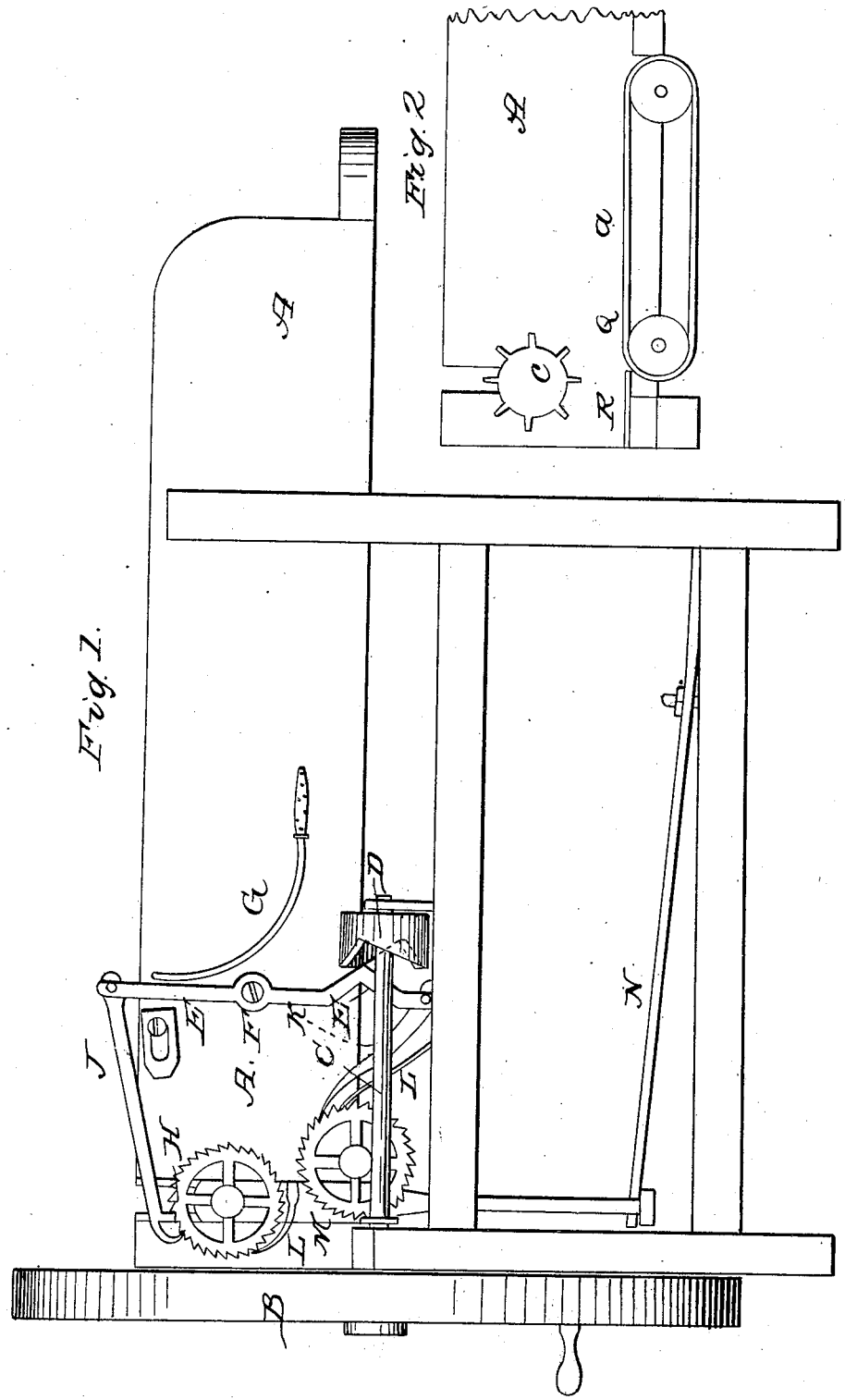

UNITED STATES PATENT OFFICE.

JOHN K. LANDIS, OF EAST HEMPFIELD, PENNSYLVANIA.

STRAW-CUTTER.

Specification of Letters Patent No. 3,234, dated August 26, 1843.

*To all whom it may concern:*

Be it known that I, JOHN K. LANDIS, of East Hempfield, in the county of Lancaster and State of Pennsylvania, have made a new and useful Improvement in the Manner of Constructing Machines for Cutting Straw; and I do hereby declare that the following is a full and exact description thereof.

My machine for cutting straw, and other articles of a like nature, is similar in its general construction to some cutting machines which have been long in use, and are well known, but I have made an improvement in the apparatus by which the feeding is effected, which causes my machine to operate more advantageously than any of those heretofore used.

In the accompanying drawing, Figure 1, is a side elevation of my machine, and Fig. 2, a vertical section along the middle of the fore part of the trough.

A, A, is one side of the trough for containing the straw, which is to be carried up to the cutting knife by means of feeding rollers, the lowermost of which carries an endless apron, that constitutes a part of the bottom of the trough.

B, is a fly-wheel which carries a cutting knife, or cutting knives, operating in the same manner with the knives used in other cutting machines of a like character. The shaft, C, of this fly-wheel carries a double cam, formed in the manner represented at D. This cam operates on a lever E, having its fulcrum at F, and an angular projection at E', to receive the action of the cam against which it is borne by the spring, G. To the lever, E, are attached the feed hands, J, and K, which operate on the respective ratchet-wheels H, and I, affixed to the axles of the feed rollers. L, L, are spring pawls which hold the ratchet wheels. The axes of the upper feed roller run in two slides, M, one on each side of the trough, which are borne down by the spring pole N.

In Fig. 2, O, is the upper, and P, the lower feeding roller; Q, is the endless apron which aids in carrying the straw forward, and R, an iron plate, or bar, against which the knife cuts.

Having thus, fully described the manner in which I construct my straw-cutting machine, and shown the operation of the same, what I claim therein as new, and desire to secure by Letters Patent, is—

1. The manner in which I have combined and arranged the cam, D, the lever, E, and the feeding apron, Q, with the trough for holding the straw in the above-described machine.

2. I do not claim either of the parts described, when taken individually, but only as they are combined with a machine for cutting straw, and by means of which a new and useful effect is produced.

JOHN K. LANDIS.

Witnesses:
   THOS. P. JONES,
   EDWIN L. BRUNDAGE.